United States Patent [19]

Smith

[11] 4,216,237

[45] Aug. 5, 1980

[54] POTASSIUM-SUPPLEMENT COMPOSITION

[76] Inventor: Walton J. Smith, Rte. 4, Grafton, N.H. 03240

[21] Appl. No.: 904,888

[22] Filed: May 11, 1978

Related U.S. Application Data

[63] Continuation-in-part of Ser. No. 835,966, Sep. 23, 1977, abandoned.

[51] Int. Cl.² ........................... A23L 1/30; A23L 1/22; A23L 1/237
[52] U.S. Cl. ...................................... 426/74; 424/127; 426/584; 426/588; 426/631; 426/632; 426/658; 426/806
[58] Field of Search ................. 426/74, 580, 584, 588, 426/590, 593, 804, 806, 631, 632, 658; 424/127

[56] References Cited

U.S. PATENT DOCUMENTS

| | | | |
|---|---|---|---|
| 2,871,123 | 1/1959 | Bauer et al. | 426/580 X |
| 2,998,315 | 8/1961 | Peebles et al. | 426/580 X |
| 3,058,828 | 10/1962 | Lindblad | 426/584 X |
| 3,097,947 | 7/1963 | Kemmarer | 426/74 X |
| 3,337,404 | 8/1967 | Polli et al. | 424/127 |
| 3,988,511 | 10/1976 | Schapiro | 426/580 |
| 4,042,684 | 8/1977 | Kahm | 426/74 X |

*Primary Examiner*—David M. Naff
*Attorney, Agent, or Firm*—Larson, Taylor and Hinds

[57] ABSTRACT

An improved potassium-supplement composition that is more palatable is prepared containing 10 to 50% of one or more potassium-containing mineral salts and a balance of from 25 to 50% by weight of the balance of a carbohydrate-containing foodstuff such as sugar or a non-hydroscopic starch hydrolysate and from 50 to 75% by weight of the balance of a potassium-containing foodstuff, at least half of which is milk solids, such as cocoa, powdered tomato or ground nuts.

5 Claims, No Drawings

POTASSIUM-SUPPLEMENT COMPOSITION

This is a continuation-in-part of application Ser. No. 835,966, now abandoned, filed Sept. 23, 1977.

This invention relates to an improved potassium-supplement composition and its preparation. There are a number of medical conditions that are treated by oral administration of potassium, e.g. hypokalemias resulting from side-effects of diuretics, from excessive diarrhea and from excessive vomiting.

Potassium chloride pills are a well-known supplement, but are prone to ulcerate the intestinal tract, particularly if they are enteric-coated. Conventionally, this problem is attacked by administering the potassium chloride in dilute, aqueous solution. However, this solution is singularly unpalatable and many patients are quite unable to take the usual dose of about 15 to 20 mEq.

Accordingly, it is an object of the present invention to provide an improved potassium-supplement composition that is more palatable and less toxic than heretofore.

The invention provides a dry potassium-supplement composition comprising from 10 to 50% by weight of the composition of one or more mineral salts selected from the group consisting of the chloride, citrate, bicarbonate and diphosphates of potassium and sodium, with the proportion in equivalents of sodium, if any is present, not exceeding that of potassium, wherein from 25 to 50% by weight of the balance of the composition comprises a water-soluble, carbohydrate, foodstuff ingredient, whilst from 50 to 75% by weight of said balance comprises an organic, potassium-containing foodstuff ingredient at least half of which is milk solids, whilst the remainder, if any, of said potassium-containing foodstuff ingredient is a flavor enhancing, plant derived foodstuff.

This composition can be made to be dry, palatable and safe, and readily dispersible in water. It has an excellent taste and appeals to the patient as a food supplement rather than a medicine. Furthermore, by completing the anionic portion of the mineral salts ingredient with substantially equal portions of bicarbonate, citrate, and diphosphate, a better balance of anions more closely related to natural potassium sources can be obtained.

Preferably, the proportion of mineral salts is from 15 to 30% by weight of the composition and one quarter to one half of the salt ingredient is comprised by the chloride.

Some examples of suitable flavor-enhancing, plant-derived foodstuffs are cocoa, powdered tomato and ground nuts, and a preferred proportion is from 20 to 40% by weight of said remainder of the organic, potassium-containing foodstuff ingredient. The carbohydrate ingredient can be sugar, a non-hygroscopic starch hydrolysate, or a mixture thereof.

The composition can be prepared by the steps of mixing and dissolving the various ingredients in water and spray-drying the resulting dispersion or solution.

When the condition to be treated is one of potassium depletion, sodium will not usually be included in the composition. However, where there is a condition of severe dehydration, and accompanying loss of salts as may occur with excessive diarrhea or vomiting, then sodium replacement may also be desired, and a sodium-containing composition will be used. Since the taste of sodium chloride is much better than that of potassium chloride, a very palatable product results.

My invention displays a synergistic effect in that the milk ingredients and potassium-containing flavor-enhancers not only render the potassium salts palatable, enabling them to be taken in dilute form, and thus, safely, but because they are themselves rich in potassium, the amount of potassium salt needed can be reduced. I have found that cocoa not only provides considerable potassium, but it is one of the best masking agents for the large amounts of the pure chemical potassium sources in the first group which are used in such a preparation. Because "dutched" cocoa is higher in potassium salts, this is the preferred form of cocoa which I use in such a product.

Since milk powder, besides supplying potassium, also supplies sodium ions, which under some circumstances might be undesirable, I use milk products such as milk solids, caseinates and whey products which have been previously dialyzed (to reduce the sodium).

The composition may include sugar for sweetening, or the sugar may be reduced or excluded and supplemented with an artificial or other sweetener, such as saccharin, cyclamate, aspartame, xylitol, levulose, etc.

The composition may be combined with flavor- and character-modifying ingredients such as starch hydrolysates, exemplified by starch hydrolysates having a low affinity for moisture such as those having DE values of about 10–15.

When the composition is spray-dried and agglomerated, the total mixture is usually dissolved in water before spray-drying. Alternatively, the milk portion with or without the cocoa may be spray-dried and agglomerated and the final potassium supplement made by simple mixing. Spray drying has the advantage of producing a uniform product.

I have discovered that I can also produce a uniform product by combining the ingredients and mixing them vigorously with the addition of lecithin. The lecithin may be added hot, if desired, and it may be diluted with a fat such as cocoa butter prior to adding it to the mixture in the mixer. The mixing is continued until the entire mixture is uniform. I prefer to use as little lecithin as necessary which ranges from $\frac{1}{4}$ to 1.5% of the total mixture, occasionally more. The objective of the lecithin is to produce a product which readily disperses in water, and at the same time produces a more uniform product because it tends to tie all the ingredients together.

EXAMPLE OF POTASSIUM SUPPLEMENT

| Salts | |
|---|---|
| Potassium Chloride | 2.27 pounds |
| Potassium Citrate | 3.60 pounds |
| Potassium Bicarbonate | 3.33 pounds |
| Dipotassium Phosphate | 3.30 pounds |
| Foodstuff | |
| Dutched Cocoa | 26.7 pounds |
| Agglomerated Non-fat Milk Powder | 32.0 pounds |
| Excipients & Flavors | |
| Sugar | 9.0 pounds |
| Maltodextrin DE10 | 18.0 pounds |
| Potassium Saccharin | 0.36 pounds |
| Vanilla flavors | 1.44 pounds |

The above formula produces 100 pounds. Lecithin has not been shown in the above formula because its use depends upon the process. If the product is made by vigorous mixing, approximately ½ pound of lecithin might be used. The flavor of the above product may also be improved somewhat by the use of approximately one pound of silica gel (Cabosil) in the formula to improve pourability and prevention of lumps.

EXAMPLE OF POTASSIUM-SODIUM-ANION SUPPLEMENT

The above formula is modified somewhat. The excipients and flavors remain much the same, and the foodstuff ingredients as shown in the second group remain the same. As stated previously, instead of potassium chloride, sodium chloride is used. Also, instead of potassium bicarbonate, sodium bicarbonate would be preferred.

While the ratios of sodium to potassium have not been established precisely, the product shown above would be quite satisfactory. It should be stressed that the formulations described in this application are for oral use only. Acute conditions often require more chloride ions, and it is not an object of this invention to prepare a product for acute conditions. In the chronic conditions resulting from diarrhea and vomiting over some period of time, there is also the need for carbohydrate. The excipients shown in the above formula in this latter function now become active ingredients and serve a double purpose of making a product palatable but also supplying very much needed carbohydrate. If desired, these may be increased, and for treating infants, slight modification of the formulations would be indicated, possibly elimination of the cocoa if the feeding is by bottle.

I claim:

1. A dry, potassium-supplement composition consisting essentially of from 10 to 50% by weight potassium chloride and a balance of from 25 to 50% by weight of the balance of a water-soluble carbohydrate, foodstuff ingredient selected from the group consisting of sugar, a non-hydroscopic starch hydrolysate and a mixture thereof and from 50 to 75% by weight of the balance of an organic, potassium-containing foodstuff ingredient at least half of which is milk solids selected from the group consisting of cocoa, powdered tomato and ground nuts.

2. A composition according to claim 1 wherein the potassium chloride is from 15 to 30% by weight of the composition.

3. A method of preparing a composition according to claim 1 comprising the steps of mixing and dissolving the recited ingredients in water, and spray-drying the resulting dispersion or solution.

4. A method according to claim 3 wherein lecithin is added to facilitate mixing.

5. A dry, potassium-supplement composition consisting essentially of from 10 to 50% by weight potassium chloride and a balance of from 25 to 50% by weight of the balance of sugar and from 50 to 75% by weight of the balance of an organic, potassium-containing foodstuff ingredient consisting essentially of milk solids and cocoa, said cocoa being in an amount of 20 to 40% by weight of said foodstuff ingredient.

* * * * *